United States Patent [19]

Getson et al.

[11] 4,123,472

[45] Oct. 31, 1978

[54] OIL RESISTANT MODIFIED SILICONE COMPOSITION

[75] Inventors: J. Charles Getson, Adrian, Mich.; Patrick J. Adams, Valley City, Ohio

[73] Assignee: SWS Silicones Corporation, Adrian, Mich.

[21] Appl. No.: 642,082

[22] Filed: Dec. 18, 1975

Related U.S. Application Data

[63] Continuation-in-part of Ser. No. 610,583, Sep. 5, 1975, abandoned, which is a continuation of Ser. No. 447,442, Mar. 1, 1974, abandoned, which is a continuation of Ser. No. 862,045, Sep. 29, 1959, abandoned.

[51] Int. Cl.$^2$ .................... C08L 83/10; C08L 43/04
[52] U.S. Cl. .................................. 260/827; 260/825
[58] Field of Search ........................... 260/827, 825

[56] References Cited

U.S. PATENT DOCUMENTS

| 3,436,252 | 4/1969 | Neuroth | 117/155 |
|---|---|---|---|
| 3,441,537 | 4/1969 | Lengnick | 260/46.5 |
| 3,624,015 | 11/1971 | Vaughan | 260/28.5 R |
| 3,627,836 | 12/1971 | Getson | 260/825 |
| 3,631,087 | 12/1971 | Lewis | 260/827 |
| 3,694,478 | 9/1972 | Adams | 260/827 |
| 3,794,694 | 2/1974 | Chadha | 260/827 |
| 3,912,670 | 10/1975 | Huemmer | 260/23 EP |

FOREIGN PATENT DOCUMENTS 860,327  2/1961  United Kingdom ............ 260/827

*Primary Examiner*—Paul Lieberman

[57] ABSTRACT

Oil resistant modified organopolysiloxane compositions are prepared by polymerizing an acrylic ester and an acrylic nitrile in the presence of an organopolysiloxane and a free-radical initiator at an elevated temperature. These modified compositions may be thermally cyclized to impart improved oil resistance to these already oil resistant compositions. The resultant compositions may be cured to form oil resistant silicone elastomers.

6 Claims, No Drawings

OIL RESISTANT MODIFIED SILICONE COMPOSITION

This is a continuation-in-part application of application Ser. No. 610,583 filed on Sept. 5, 1975, which was a continuation of application Ser. No. 447,442 filed on Mar. 1, 1974, which was a continuation of application Ser. No. 862,045 filed on Sept. 29, 1969, and all now abandoned.

The invention relates to modified silicones, particularly to oil resistant modified silicones and more particularly to silicone elastomers which have oil resistant properties.

Silicone polymers have found wide industrial applications because of their physical and chemical properties; however, one of the problems which has plagued the silicone industry has been that of improving the oil resistance of these silicone polymers. In the past, attempts have been made to improve these properties by the addition of various materials; however, such methods may involve the addition of expensive materials or in some cases, may result in materially altering some of the more desirable physical properties.

Various attempts have been made to modify the silicone polymers per se in order to impart desirable chemical and physical properties thereto. Generally, silicone polymers have been modified by reacting organopolysiloxanes containing either alkenyl radicals or hydrogen atoms bonded to the silicon atoms with unsaturated hydrocarbons. However, most of the modified silicone polymers thus prepared do not exhibit desirable oil resistant properties.

It is, therefore, an object of this invention to provide oil resistant modified silicone polymers. Another object of this invention is to provide an organopolysiloxane composition which can be cured to form oil resistant elastomers. A further object of this invention is to provide curable modified silicone polymers which are resistant to swelling when placed in contact with oil.

The foregoing objects and others which will become apparent from the following description are accomplished in accordance with this invention, generally speaking, by providing oil resistant modified silicone polymers. These oil resistant modified silicone polymers are prepared by polymerizing a mixture containing unsaturated monomers having nitrile and ester functionality with an organopolysiloxane at an elevated temperature in the presence of a free-radical initiator. It was found that the oil resistant properties of these compositions may be improved by cyclizing these compositions, i.e., the compositions may be heated at elevated temperatures of from about 125 to about 300° C. for about 24 hours or longer. The resultant composition may be combined with a curing agent and a filler, if desired, to form a room temperature curable silicone elastomer having oil resistant properties.

The modified organopolysiloxanes may be represented by the general formula

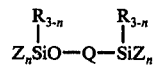

in which the R groups may be the same or different and represent hydrocarbon radicals; Q represents a siloxane radical of the formula

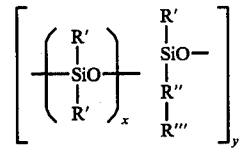

wherein the R'(s), which may be the same or different, represent hydrocarbon radicals having up to 18 carbon atoms, halogenated hydrocarbon radicals having up to 18 carbon atoms, or cyanoalkyl radicals; R" is a divalent hydrocarbon radical; R''' is a copolymeric group derived from an acrylic ester and an acrylic nitrile and is linked to R" by a carbon-to-carbon linkage; Z is a functional group selected from the class consisting of aliphatically unsaturated groups, hydrolyzable groups or condensable groups such as hydrogen, hydroxyl, amino, amido, aminoxy, oximo, halogen, acyloxy, hydrocarbonoxy, phosphato or vinyl groups ($CH_2=CH-$); $n$ is a number of from 1 to 3; $x$ is a number of from 0 to 20,000; and $y$ is a number of from 1 to 500.

It has been found that the modified organopolysiloxanes of this invention may have one or more side chains or branches consisting of a carbon-chain polymer linked to the organopolysiloxane polymers. In preparing these compositions, hydrogen may be abstracted from the organopolysiloxane polymer by a free-radical initiator to form an active site for grafting the organic polymer thereto.

The term modified siloxanes or modified organopolysiloxanes as used herein includes the entire reaction product, i.e., homopolymers and copolymers obtained from the reaction as well as grafted polymers in which some or all of the organic polymers may be linked to the siloxane chain by a carbon-to-carbon linkage.

Any organopolysiloxane capable of forming free radicals or active sites may be used in the preparation of modified organopolysiloxanes. It is preferred that the organopolysiloxane have lower alkyl radicals attached to the silicon atoms since these are more amenable to hydrogen abstraction than other radicals.

The organopolysiloxanes used in the grafting step may be represented by the formula

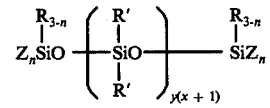

wherein R, R', Z, n, x and y are the same as those described above. In the above formula, R and R', which may be the same or different, represent organic radicals such as alkyl radicals, e.g., methyl, ethyl, propyl, and butyl radicals; alkenyl radicals, e.g., vinyl and allyl and aryl radicals, e.g., phenyl. R' may also represent halo- or cyano- substituted alkyl and aryl radicals.

Examples of suitable organopolysiloxanes and copolymers thereof which may be used in the formation of the modified polymers are hydroxyl-terminated siloxane fluids such as dimethylpolysiloxane fluids, methylphenyl siloxane fluids, vinyl-terminated dimethylpolysiloxane fluids, methylvinylpolysiloxane fluids and copolymers of dimethylsiloxane and methyl-, phenyl-, or diphenylsiloxane units.

Examples of suitable unsaturated monomers having nitrile and ester functionality are acrylonitrile and substituted acrylonitriles such as methacrylonitrile, alpha-chloro-acrylonitrile; acrylates and substituted acrylates such as methyl acrylate, ethyl acrylate, propyl acrylate, butyl acrylate, methyl methacrylate, ethyl methacrylate, propyl methacrylate, butyl methacrulate, and the like.

In the preparation of the modified organopolysiloxane compositions of this invention, the amount of organopolysiloxane may be varied within wide limits. Although the siloxanes may comprise from about 25 to 75 percent or more, it is preferred that it range from about 30 to 50 percent by weight of the reactants. Higher or lower amounts may be used, but the properties of the resulting modified materials may be substantially altered, especially when the siloxane content is below about 25 percent, then a semi-solid product may result.

While the ratio of the monomers, that is, the acrylic ester and the acrylic nitrile, may vary within wide limits, it is preferred that the acrylic nitrile range from about 5 to 95 mole percent and more preferably from about 10 to 70 mole percent of the monomers. Furthermore, it has been found that the oil resistant properties of the curable organopolysiloxane composition will improve as the ratio of the acrylic nitrile to acrylic ester increases; however, if the amount of acrylic nitrile exceeds about 70 mole percent of the monomers, other desirable properties are substantially inferior, thus, by using at least one monomer having a nitrile functionality, and at least one monomer having an ester functionality modified oil resistant products are obtained which far exceed the prior compositions.

In preparing the modified organopolysiloxanes of this invention, the graft polymerization is most expeditiously carried out in the presence of free-radical initiators, normally organic peroxides, although other free-radical initiators such as azocompounds may be used. Ionizing radiation may also be used to bring about the formation of free radicals.

The most suitable peroxide initiators are hydroperoxides such as t-butyl hydroperoxide, cumene hydroperoxide and decalin hydroperoxide; dialkyl peroxides such as t-butyl and dicumyl peroxide, 1,1-di-t-butyl-peroxy,-3,3,5-trimethylcyclohexane and 2,5-dimethyl-2,5-di-t-butylperoxyhexane; cyclic peroxides such as ascaridole; peresters such as t-butyl perbenzoate, t-butylperoxy isopropyl carbonate and t-butyl peroctoate; keto peroxides such as acetone peroxide and cyclohexanone peroxide and diacyl peroxides such as benzoyl peroxide.

The amount of free-radical initiator used is not critical; thus, as little as 0.05 percent of the more active peroxide initiators based on the weight of the monomers is adequate in most cases. Where it is desirable to increase the reaction rate, then as much as 3 percent or even more of the initiator may be used.

Although the temperature and pressure are not critical, it is preferred that the grafting operation be conducted at temperatures and pressures sufficient to maintain the organic monomers in a liquid phase. Generally, temperatures below about 150° C. and more preferably between about 50° and 150° C. are sufficient for the graft polymerization.

The graft polymerization may occur in the presence or absence of an inert solvent. Where reactive monomers are used, a volatile organic solvent may be used to help control the graft polymerization temperature. Thus, any organic solvent boiling between about 50° to about 150° C. and having a relatively low chain transfer constant may be used in the graft polymerization step. When a solvent is employed, it should be within the range of from about 2 to about 50 percent, preferably from about 10 to 40 percent by weight based on the weight of the composition, i.e. solvents and reactants.

Examples of suitable solvents are aromatic hydrocarbons such as benzene, toluene, xylene; chlorinated aromatic hydrocarbons such as chlorobenzene; aliphatic hydrocarbons such as pentane, hexane, octane; cycloaliphatic hydrocarbons such as 1,1-dimethylcyclopentane and cyclohexane. Other solvents which may be used are esters such as methyl acetate, ethyl acetate, propyl acetate, butyl acetate, amyl acetate, isoamyl acetate, methyl butyrate, ethyl valerate, and the like.

As mentioned heretofore, the graft polymerization temperature may be controlled by the use of a solvent or by the gradual addition of the monomers and/or initiators. Thus, the monomers may be mixed prior to their addition to the organopolysiloxane fluid or they may be added separately but simultaneously to the reaction medium along with the initiator in controlled increments. After the graft polymerization step is terminated, the desired product may be separated from the unreacted monomers by any conventional technique known in the art, such as by distillation, solvent extraction or selective solvent fractionation.

The modified organopolysiloxanes thus prepared may be combined with cross-linking agents to form room temperature curable elastomers. For example, modified organopolysiloxanes containing terminal hydroxyl groups may be mixed with silanes having the general formula $X_{4-m}SiY_m$ or siloxanes in which the silicon atoms are linked through Si-O-Si linkages, wherein X is a relatively unreactive group, such as an alkyl or aryl radical; Y represents an acyloxy, oximo, alkoxy, aryloxy, halogen, aminoxy, amido, phosphate group or derivatives thereof; and m is an integer of from 2 to 4. Generally, these silanes or siloxanes are added as endblocking agents to hydroxyl-terminated modified organopolysiloxanes, thereby replacing the hydroxyl groups with functional groups of the type $OSiX_{4-m}Y_{m-1}$. Examples of suitable silanes are methyltriacetoxysilane, isopropyltriacetoxysilane, isopropoxytriacetoxysilane, methyltriacetoximosilane, methyltris-(diethylaminoxy)-silane, methyltris (diethylphosphato)silane, methyltris-(cyclohexylamino)silane, tetracetoxydisiloxane and the like.

These compositions may be cured by merely exposing them to atmospheric moisture with or without any additional water vapor. Curing times may vary from a few minutes to several hours or days.

In a conventional two-component system, hydroxyl-terminated modified organopolysiloxanes are mixed with polyalkoxysilanes of the formula $(R^1O)_zSiR^2_{4-z}$ or polyalkoxysiloxanes in which the silicon atoms are linked through Si-O-Si linkages and the remaining valences of the silicon atom are satisfied by the groups $R^1O$ and $R^2$. In the above formula, the groups represented by $R^1$ and $R^2$ are monovalent hydrocarbon radicals having up to 8 carbon atoms, and z has a value of from 3 to 4. Examples of monovalent hydrocarbon radicals are methyl, ethyl, propyl, butyl, hexyl, phenyl, vinyl, allyl, ethylallyl, butadienyl, and the like. The polyalkoxysilanes used herein include monoorganotrihydrocarbonoxysilanes, tetrahydrocarbonoxysilanes, alkyl silicates, and partial hydrolyzates thereof. The polyalkoxy compounds, e.g., ethyl orthosilicate or partially hydrolyzed ethyl silicates such as ethyl silicate "40", are representative examples of these compounds. Other operative curing agents are ethyltrimethoxysilane, methylbutoxydiethoxysilane, propyltripropoxysilane, methyltriethoxysilane, ethyltriethoxysilane, ethyl orthosilicate, and n-butyl orthosilicate. Examples of alkyl polysilicates are ethyl polysilicate, isopropyl polysilicate, and butyl polysilicate; polysiloxanes such as dimethyltetraethoxydisiloxane, trimethylpentabutoxytrisiloxane, and the like.

The silanes or siloxanes employed therein may be used either alone or in combination. They should be used in a proportion of from about 0.5 to about 20 percent and more preferably from about 1 to 10 percent by weight based on the weight of the organopolysiloxane. If the total weight of the silanes or siloxanes employed is below about 0.5 percent by weight based on the weight of the modified organopolysiloxanes, the cure rate is extremely slow. If, on the other hand, the total weight of the silanes or siloxanes is above 10 percent by weight based on the weight of the modified organopolysiloxanes, the cure time will not be substantially reduced.

When the hydroxyl-terminated modified organopolysiloxane compositions are mixed with the polyalkoxysilanes or the polyalkoxysiloxanes, it is preferred that a catalyst such as a metallic salt of an organic compound be employed. The metallic component of the catalyst is preferably tin, but may be lead, chromium, antimony, iron, cadmium, barium, calcium, titanium, bismuth, or magnesium. Examples of suitable salts are tin naphthenate, lead octoate, tin octoate, iron stearate, tin oleate, antimony octoate, tin butyrate, and the like. Organotin catalysts which may be used include dibutyltin dilaurate, bis(dibutylphenyltin) oxide, bis(acetoxydibutyltin) oxide, bis(tributyltin) oxide, dibutoxy dibutyltin, tri-t-butyltin hydroxide, triethyltin hydroxide, diamyldipropoxytin, dioctyltin dilaurate, diphenyloctyltin acetate, dodecyldiethyltin acetate, trioctyltin acetate, triphenyltin acetate, triphenyltin laurate, triphenyltin methacrylate, dibutyltin butoxy chloride, and the like.

These catalysts may be dispersed in a solvent and then added to the hydroxyl-terminated modified organopolysiloxanes or they may be dispersed on a suitable filler or additive and thereafter milled with the modified polymer to effect curing. Examples of suitable hydrocarbon solvents are benzene, toluene, xylene, and the like. Also, halogenated solvents such as tetrachloroethylene or chlorobenzenes; organic ethers such as diethyl ether, dibutyl ether, and hydroxyl free fluid polysiloxanes may be used. It is preferred that the solvent be sufficiently volatile so that it will evaporate at room temperature When the two-component systems are to be stored prior to use, it is essential that either the catalyst or curing agent be stored separately. In other words, the hydroxyl-terminated modified organopolysiloxane, curing agent and filler, if desired, may be compounded and the catalyst added just prior to use. In another method, the organopolysiloxane, catalyst, and filler, if desired, may be compounded and a curing agent added just prior to use. Where an inert filler is used, it may be added to either the hydroxyl-terminated modified organopolysiloxane or the curing agent prior to the addition of the catalyst or immediately after the reactants have been combined. Upon mixing these ingredients, the compositions cure spontaneously at room temperature.

The amount of catalyst used in these curing systems may range from 0.05 to about 2 percent by weight, preferably from about 0.1 to about 1 percent by weight based on the weight of the composition. A mixture of two or more of the catalysts mentioned above may be used, if desired. The amount of catalyst added to the base composition is determined by the requirements of the particular job, especially the pot life or working time required. In caulking, for example, a working time of 1 to 2 hours is required; thus an amount of catalyst is added that will not result in any substantial stiffening of the caulking composition in a shorter time. Normally, the composition is tack-free within two to four hours following the caulking operation and substantially cured after about 24 hours and completely cured after about 7 days. The period of time may vary somewhat with changes in humidity and temperature.

Modified organopolysiloxanes which have terminal vinyl groups or have vinyl groups along the siloxane chain may be combined with hydrogenpolysiloxanes to form a curable composition.

The hydrogenpolysiloxanes may be homopolymers or copolymers containing at least one unit per molecule of the formula $$R^3_c(H)_d SiO_{\frac{4-c-d}{2}}$$

with the remaining siloxane units, if any, in the organopolysiloxane having the formula $$R_e SiO_{\frac{4-e}{2}}$$

where $R^3$ is a monovalent hydrocarbon radical having up to 18 carbon atoms, R is the same as above, $c$ has a value of from 0 to 2, $d$ has a value of from 1 to 2, the sum of $c+d$ is equal to from 1.0 to 3.0 and $e$ has a value of from 0.8 to 2.5.

Organopolysiloxanes which may be employed in this invention are polymers and copolymers containing up to one or more of the units having the formula $$R_3'SiO_{0.5}, R_2'SiO, R'SiO_{1.5} \text{ or } SiO_2$$

along with at least one unit per molecule having the formula $$R^3HSiO, R^3_2HSiO_{0.5}, HSiO_{1.5}, H_2SiO \text{ or } RH_2SiO_{0.5}$$

where R' and $R^3$ are the same as above.

The hydrogenpolysiloxanes are well known in the art and include such materials as 1,3-dimethyldisiloxane, 1,1,3-trimethyldisiloxane, 1,1,3,3-tetramethyldisiloxane as well as higher polymers containing up to 100,000 or more silicon atoms per molecule. Also included are cyclic siloxanes such as cyclic polymers of methyl hydrogen siloxane having the formula $$(CH_3SiHO)_p$$

where $p$ is a whole number of from 3 to 10.

Although it is possible to effect the addition reaction between compounds containing silicon-hydrogen linkages and multiple bonds of organic compounds containing aliphatic unsaturation by employing heat along or both heat and pressure in the absence of a catalyst, it is preferred that a catalyst such as platinum or a platinum compound or complex be employed. Any well known platinum catalysts which are effective for catalyzing the reaction between silicon-bonded hydrogen groups and silicon-bonded vinyl groups may be employed. These materials include the various finely divided elemental platinum catalysts such as those described in U.S. Pat. No. 2,970,150 to Bailey, the chloroplatinic acid catalysts described in U.S. Pat. No. 2,823,218 to Speier, the platinum hydrocarbon complexes described in U.S. Pat. Nos. 3,159,601 to Ashby and 3,159,662 to Ashby, as well as the platinum alcoholate catalysts described in U.S. Pat. No. 3,220,972 to Lamoreaux. Other platinum catalysts which may be employed are those described in U.S. Pat. No. 3,474,123 to Kelly et al and U.S. Pat. Nos. 3,715,334, 3,775,4512 and 3,814,730 to Karstedt as well as the chloroplatinic acid-amino-fluid complex described by Martin.

Regardless of the type of platinum catalyst employed, the catalyst should be used in an amount sufficient to provide from about $10^{-3}$ to $10^{-6}$ gram atoms of platinum per mole of silicon-bonded vinyl groups in the composition.

The modified organopolysiloxane composition, organohydrogenpolysiloxane and platinum catalyst can be mixed in any suitable manner and the mixture cured at room temperature up to a temperature of about 120° C. for a few minutes up to several hours. Obviously, the rate of cure is a function of both the concentration of platinum catalyst and the temperature of cure.

Although not essential, fillers may be incorporated in these modified organopolysiloxane compositions. Examples of suitable fillers are fumed silicas, high-surface-area precipitated silicas, and silica aerogels, as well as coarser silicas such as diatomaceous earth, crushed quartz, and the like. Other fillers which may be used are metallic oxides, such as titanium oxide, ferric oxice, zinc oxide; fibrous fillers, such as asbestos, fibrous glass, and the like. Organic fillers having a thixotropic effect, such as lithium stearate and Thixcin R, a castor oil derivative, may be used. Additives, such as pigments, antioxidants, ultraviolet absorbers, and the like, may be included in these compositions.

It has been found that improved oil resistant properties may be imparted to the modified organopolysiloxane compositions by heating the compositions in the presence of air to an elevated temperature, i.e.; from about 125° C. to 300° C. for about 4 hours or longer. These modified organopolysiloxanes may be heated to the elevated temperature either prior to or after being combined with cross linking agents and before as well as subsequent to curing. It is preferred that the modified organopolysiloxanes be cyclized i.e.; heat aged at temperatures in the range of from 150° to 300° C. prior to curing, thereby avoiding shrinkage or weight loss which occurs on cyclization of the cured composition.

Although we do not know with certainty exactly what is happening and the present invention is not intended to be limited to any particular mode of reaction, it is postulated that thermal cyclization results in the formation of polyheterocyclics which are both highly oil resistant and heat resistant. It has been observed that thermal cyclization generally results in the product changing in color from yellow to brown and finally black.

The cured modified silicone polymers thus prepared in accordance with this invention exhibit excellent oil resistant properties. Thus, they are suitable as sealants and gaskets. The cured compositions are suitable for hydraulic fluids, lubricants and the like.

Various embodiments of this invention are further illustrated by the following examples in which all parts are by weight unless otherwise specified.

EXAMPLE 1

About 80 parts of hydroxyl-terminated dimethylpolysiloxane fluid (viscosity 400 cp.) is stirred and heated in a reactor at 115±3° C. A mixture containing 120 parts of ethyl acrylate and 1.2 parts of benzoyl peroxide is added to the dimethylpolysiloxane fluid over a 2 hour period. The temperature is maintained for an additional 15 minutes after the addition is complete. The resultant product is stripped at 100° C. at less than 1 mm. Hg vacuum for 2 hours.

About 50 parts of the resulting product are mixed with about 3 parts of ethyl silicate "40" and 0.5 part of dibutyltin butoxy chloride and cured at room temperature at a relative humidity of from 30 to 70 percent for 7 days. The cured product is tested for oil resistance in accordance with the procedure described in ASTM D 471-66. The results of these tests in ASTM #1 and #3 oils are illustrated in Table I.

EXAMPLE 2

To a reactor containing 62.2 parts of hydroxyl-terminated dimethylpolysiloxane fluid (400cp.) is added through an addition funnel a mixture containing 13.4 parts of methacrylonitrile, 80 parts of ethyl acrylate and 1.2 parts of benzoyl peroxide. The reactants are agitated during the addition of the methacrylonitrile-ethyl acrylate mixture and maintained at a temperature between 90° and 110° C. for a period of about 5 hours. The reaction product is heated at an elevated temperature under a vacuum of about 1 mm. Hg or less to remove the unreacted monomers.

The product obtained above is mixed with ethyl silicate "40" and dibutyltin butoxy chloride in accordance with the procedure described in Example 1. The oil resistant properties are illustrated in Table I.

EXAMPLE 3

A mixture consisting of about 20.1 parts of methacrylonitrile and 70 parts of ethyl acrylate is added to a reactor containing 60 parts of hydroxyl-terminated dimethylpolysiloxane fluid (400 cp.) and 1.86 parts of a 50 percent solution of 1,1-di-t-butylperoxy-3,3,5-trimethylcyclohexane in dibutyl phthalate. The reactants are stirred and heated at 100±5° C for about 5 hours. The unreacted monomers are removed at an elevated temperature and the resulting product is mixed with ethyl silicate "40" and dibutyltin butoxy chloride and cured at room temperature for 7 days. The oil resistant properties are illustrated in Table I.

EXAMPLE 4

In accordance with the procedure described in Example 3, a mixture containing about 33.5 parts of methacrylonitrile, 50 parts of ethyl acrylate and 1.72 parts of the peroxide solution of Example 3 is added to a reactor containing 55.6 parts of a hydroxylterminated dimethylpolysiloxane fluid (400 cp.) and heated to a temperature of between about 90° and 108° C. for about 5 hours. The unreacted monomers are removed at an elevated temperature under a vacuum of about 1 mm. Hg or less.

About 50 parts of the resulting liquid product are mixed with about 3 parts of ethyl silicate "40" and 0.5 part of dibutyltin butoxy chloride, poured into a mold and cured at room temperature at a relative humidity of 30 to 70 percent for 7 days. The cured material is tested for oil resistance in accordance with the procedure described in ASTM D 471-66. The results of the oil resistant tests are illustrated in Table I.

EXAMPLE 5

A mixture containing 40.2 parts of methacrylonitrile, 40 parts of ethyl acrylate and 1.65 parts of the peroxide solution of Example 3 is added to a reactor containing 53.5 parts of a hydroxyl-terminated dimethylpolysiloxane fluid (400 cp.) in accordance with the procedure described in Example 3.

About 50 parts of the liquid product obtained above is mixed with about 3 parts of ethyl silicate "40" and 0.5 parts of dibutyltin butoxy chloride and cured at room temperature at a relative humidity of from 30 to 70 percent for 7 days. The oil-resistant properties of the cured product are illustrated in Table I.

EXAMPLE 6

In accordance with the procedure described in Example 2, a mixture containing 46.9 parts of methacrylonitrile, 30 parts of ethyl acrylate and 1.58 parts of the peroxide solution of Example 3 is added to a reactor containing 51.2 parts of a hydroxyl-terminated dimethylpolysiloxane fluid (400 cp.).

About 50 parts of the resulting liquid product is mixed with 3 parts of ethyl silicate "40" and 0.5 part of dibutylin butoxy chloride and cured at room temperature at a relative humidity of from 30 to 70 percent for 7 days. The oil resistant properties of the elastomer are illustrated in Table I.

EXAMPLE 7

About 74 parts of a hydroxyl-terminated dimethylpolysiloxane (400 cp.) are added to a reactor, stirred and heated to 120±2° C. A mixture consisting of 33.5 parts of methacrylonitrile and about 0.34 part of benzoyl peroxide is added to the reactor over a 33 minute period. The temperature is maintained for an additional 6 minutes after addition is completed. The polymer is then vacuum stripped at 100° C. at 1 mm. Hg for 2 hours. A pink opaque liquid is recovered having a viscosity of about 1,720 cp.

About 50 parts of the resulting product are mixed with about 3 parts of ethyl silicate "40" and 0.5 part of dibutyltin butoxy chloride, and cured at room temperature at a relative humidity of from 30 to 70 percent for 7 days. The cured product is tested for oil resistance in accordance with the procedure described in ASTM D 471-66. The results of these tests in ASTM #1 and #3 oils are illustrated in Table I.

EXAMPLE 8

To a reactor containing 65.5 parts of a hydroxyl-terminated dimethylpolysiloxane fluid (400 cp.) is added with agitation a mixture containing 21.2 parts of acrylonitrile, 77 parts of butyl acrylate and 0.49 part of t-butyl peroxide. The reactants are heated to a temperature of 70±4° C. and maintained at this temperature for a period of about 4 hours. The reaction product is vacuum stripped at 70° C. at less than 1 mm. Hg for one hour.

The above product is mixed with ethyl silicate "40" and dibutyltin butoxy chloride in accordance with the procedure described in Example 1. The oil resistant properties are illustrated in Table I.

EXAMPLE 9

To a reactor containing 79 parts of a hydroxyl-terminated dimethylpolysiloxane fluid (400 cp.) is added with agitation a mixture containing 41.6 parts of styrene, 76.8 parts of butyl acrylate, and 0.3 part of t-butyl perbenzoate. The reactants are heated at a temperature of 125±3° C. for about 1.25 hours and then vacuum stripped at 120° C. at less than 1 mm. Hg for one hour.

About 50 parts of the resulting product prepared above are mixed with 3 parts of ethyl silicate "40" and 0.5 part of dibutyltin butoxy chloride, and cured at room temperature for 7 days at a relative humidity of from 30 to 70 percent. The cured product is tested for oil resistance in accordance with the procedure described in Example 1. The oil resistance properties are illustrated in Table I.

EXAMPLE 10

About 50 parts of a hydroxyl-terminated dimethylpolysiloxane fluid (400 cp.) are mixed with 3 parts of ethyl silicate "40" and 0.5 part of dibutyltin butoxy chloride, poured into a mold and cured at room temperature at a relative humidity of from 30 to 70 percent for 7 days. The cured product is tested for oil resistance in accordance with the procedure described in ASTM D 471-66. The results of these tests are illustrated in Table I.

EXAMPLE 11

To about 100 parts of a hydroxyl-terminated dimethylpolysiloxane fluid (2,000 cp.) are added about 6 parts of ethyl silicate "40" and 75 parts of iron oxide with agitation. The ingredients are heated to about 121° C. over a period of about 0.5 hour, cooled to room temperature and milled on a three-roll mill. About 1.0 part of dibutyltin butoxy chloride is added to the milled material, poured into a mold and cured at room temperature at a relative humidity of from 30 to 70 percent for 7 days. The cured product is tested for oil resistance in accordance with the procedure described in ASTM D 471-66. The results are illustrated in Table I.

EXAMPLE 12

(a) To a reactor containing 704 parts of a hydroxyl-terminated dimethylpolysiloxane fluid (400 cp. at 25° C.) is added with agitation a mixture containing 896 parts of butyl acrylate, 159 parts of acrylonitrile and 5.2 parts of t-butyl peroctoate. The reactants are heated to a temperature of 70±4° C. and maintained at this temperature for a period of about 4 hours. The reaction product is vacuum stripped at 70° C. at less than 1 mm. Hg for one hour.

About 100 parts of the product prepared above are mixed with 3 parts of ethyl silicate "40" and 0.5 part of dibutyltin butoxy chloride and cured at room temperature for 7 days at a relative humidity of from 30 to 70 percent. The cured product is cyclized in the presence of air at 200° C. for 48 hours and then tested for oil resistance in accordance with the procedure described in Example 1. The oil-resistant properties are illustrated in Table III. (b) The procedure described above is repeated, except that the produce is not cyclized. The oil-resistant properties of the uncylcized product are shown in Table III.

EXAMPLE 13

(a) To a reactor containing 660 parts of a hydroxyl-terminated dimethylpolysiloxane fluid (400 cp. at 25° C.) is added with agitation a mixture containing 708 parts of butyl acrylate, 212 parts of acrylonitrite and 5.0 parts of t-butyl peroctoate. The reactants are heated to a temperature of 70±4° C. and maintained at this temperature for a period of about 4 hours. The reaction product is vacuum stripped at 70° C. at less tha 1 mm. Hg for one hour.

About 100 parts of the product prepared above are mixed with 2 parts of ethyl silicate "40" and 1.0 part of dibutyltin butoxy chloride and cured at room temperature for 7 days at a relative humidity of from 30 to 70 percent. The cured product is cyclized in the presence of air at 260° C. for 24 hours and then tested for oil-resistance in accordance with the procedure described in Example 1. The oil resistant properties are illustrated in Table III.

(b) The procedure described above is repeated except that the product is not cyclized. The oil resistant properties of the uncyclized product are shown in Table III.

(c) The procedure described in Example 13 (a) is repeated except that 4 parts of ethyl silicate "40" and 2 parts of dibutyltin butoxy chloride are added to 100 parts of the product and cured for 7 days at room temperature at a relative humidity of from 30 to 70 percent. The cured product is cyclized at 260° C. in the presence of air for 24 hours and then tested for oil resistance. The results are shown in Table III.

(d) The procedure of Example 13 (c) is repeated except that the product is not cyclized. The oil resistant properties of the uncyclized product are illustrated in Table III.

EXAMPLE 14

(a) In a comparison example 100 parts of a hydroxyl-terminated dimethylpolysiloxane fluid (2,000 cp. at 25° C.) are mixed with 3 parts of ethyl silicate "40", 75 parts of red iron oxide and 0.5 part of dibutyltin butoxy chloride and cured for 7 days at room temperature at a relative humidity of from 30 to 70 percent. The oil resistanct properties are illustrated in Table III.

(b) The procedure described in Example 14 (a) is repeated except that the iron oxide is omitted and 6 parts of ethyl silicate "40" and 1 part of dibutyltin butoxy chloride are added to 100 parts of the hydroxyl-terminated-dimethylpolysiloxane (2,000 cp. at 25° C.) The resultant composition is cured for 7 days and then tested for oil resistance. The results are illustrated in Table III.

(c) The procedure described in Example 14 (b) is repeated except that the hydroxyl-terminated dimethylpolysiloxane fluid has a viscosity of 400 cp. at 25° C. The oil resistant properties are illustrated in Table III.

EXAMPLE 15

To a reactor containing 330 parts of a hydroxyl-terminated dimethylpolysiloxane fluid (400 cp. at 25° C.) is added with agitation a mixture containing 384 parts of butyl acrylate, 106 parts of acrylonitrile and 2.5 parts of t-butyl perocatate. The reactants are heated to a temperature of 70±4° C. and maintained at this temperature for a period of about 4 hours. The reaction product is vacuum stripped at 70° C. at less than 1 mm. Hg for 1 hour. The product is then cyclized in the presence of air at 200° C. for 740 hours.

About 100 parts of the resultant product are mixed with 3 parts of ethyl silicate "40" and 1.0 part of dibutyltin butoxy chloride and cured at room temperature for 7 days at a relative humidity of from 30 to 70 percent. The oil resistant properties of this product are substantially the same as the product prepared in Example 13(a) except that the problem associated with shrinkage and weight loss of the cured material is avoided.

TABLE I

| EX NO. | OH-FLUID Percent | MONOMERS Percent | | OIL RESISTANCE * | | | |
|---|---|---|---|---|---|---|---|
| | | | | ASTM #1 OIL | | ASTM #3 OIL | |
| | | | | ΔV | ΔW | ΔV | ΔW |
| | | MAN | EA | | | | |
| 1 | 40 | — | 60.0 | 0.9 | 0.4 | 27.1 | 23.5 |
| 2 | 40 | 8.6 | 51.4 | 0.5 | 0.3 | 23.1 | 19.9 |
| 3 | 40 | 13.4 | 46.6 | 0.2 | 0.1 | 22.3 | 19.5 |
| 4 | 40 | 24.1 | 35.9 | −1.4 | −0.9 | 20.0 | 18.2 |
| 5 | 40 | 30.1 | 29.9 | −1.6 | −1.3 | 19.4 | 16.0 |
| 6 | 40 | 36.6 | 23.4 | 0.2 | −0.5 | 16.5 | 14.3 |
| 7 | 69 | 31.0 | — | 0.7 | 0.4 | 27.0 | 24.0 |
| | | AN | BA | | | | |
| 8 | 40 | 12.9 | 47.1 | 1.6 | −0.2 | 31.2 | 25.0 |
| | | S | BA | | | | |
| 9 | 40 | 21.1 | 38.9 | 8.0 | 6.5 | 100.8 | 90.0 |
| 10 | 100 | — | — | 7.0 | 2.5 | 44.3 | 33.9 |
| 11 | 100 | — | — | 5.9 | 2.1 | 38.6 | 20.3 |

AN = acrylonitrile
BA = butyl acrylate
MAN = methacrylonitrile
EA = ethyl acrylate
S = styrene
ΔV = volume change, percent
ΔW = weight change, percent
* = Immersed in ASTM #1 and #3 oils for 22 hours at 300° F.

The above table shows that graft compositions containing ethyl acrylate and methacrylonitrile are superior in oil-resistance to those containing ethyl acrylate alone and far superior to ungrafted silicones or to silicones grafted with styrene and butyl acrylate. Likewise, the degree of swelling decreases as the proportion of nitrile in the graft increases. Table II shows that the physical properties, especially elongation and tensile strength decrease as the weight percent of the methacrylonitrile exceeds about 50 percent of the total weight of the monomers.

TABLE II

| EX. NO. | WEIGHT PERCENT | | | PHYSICAL PROPERTIES | | | |
|---|---|---|---|---|---|---|---|
| | OH-Fluid 400 cp. | Monomers MAN | EA | Tensile Strength, psi. | Elongation, % | Tear Strength lb./in. | Hardness Shore A |
| 1 | 40 | — | 60.00 | 356 | 178 | 49 | 32 |
| 2 | 40 | 8.6 | 51.4 | 889 | 248 | 110 | 63 |
| 3 | 40 | 13.4 | 46.6 | 1242 | 244 | 216 | 78 |
| 4 | 40 | 24.1 | 35.9 | 1008 | 41 | 57 | 83 |
| 5 | 40 | 30.1 | 29.9 | 820 | 33 | 46 | 83 |
| 6 | 40 | 36.6 | 23.4 | 817 | 26 | 19 | 88 |
| 7 | 69 | 31.0 | — | 166 | 33 | 21 | 60 |

MAN = methacrylonitrile
EA = Ethyl acrylate

TABLE III

| EX. NO. | MOLE PERCENT AN:BA OH FLUID | ES "40" PERCENT | HEAT AGING | | | OIL RESISTANCE | | | |
|---|---|---|---|---|---|---|---|---|---|
| | | | TEMP. °C. | TIME HRS. | WEIGHT LOSS % | ASTM #1 ΔV | ΔW | ASTM #3 ΔV | ΔW |
| 12(a) | 30:70:40 | 3 | 200 | 48 | 6.7 | +1.5 | +2.8 | +26.6 | +26.3 |
| (b) | 30:70:40 | 3 | — | — | — | +6.2 | +0.6 | +48.2 | +40.0 |
| 13(a) | 40:60:40 | 2 | 260 | 24 | 27.8 | +4.9 | +2.86 | +17.9 | +18.9 |
| (b) | 40:60:40 | 2 | — | — | — | +1.94 | +0.70 | +28.9 | +26.8 |
| (c) | 40:60:40 | 4 | 260 | 24 | 27.0 | +5.22 | +3.45 | +17.7 | +13.7 |
| (d) | 40:60:40 | 4 | — | — | — | +1.64 | −0.21 | +31.2 | +25.0 |
| 14(a) | OH Fluid | 3 | — | — | — | +5.9 | +2.1 | +38.6 | +20.3 |
| (b) | OH Fluid | 6 | — | — | — | +3.1 | +2.9 | +53.5 | +44.6 |
| (c) | OH Fluid | 6 | — | — | — | +7.0 | +2.5 | +44.3 | +33.9 |

AN = acrylonitrile
BA = butyl acrylate
OH-Fluid = dimethylpolysiloxane fluid
ES-"40" = ethyl silicate "40"
ΔV = volume change, percent
ΔW = weight change, percent

EXAMPLE 16

To a reactor containing 330 parts of a vinyl terminated dimethylpolysiloxane fluid (400 cP at 25° C.) is added with agitation a mixture containing 384 parts of butyl acrylate, 106 parts of acrylonitrile and 2.5 parts of 1,1-di-t-butylperoxy-3,3,5-trimethylcyclohexane.

The reactants are heated to a temperature of from 70 to 80° C. and maintained at this temperature for a period of about 6 hours. The product is vacuum stripped at about 70° C. at less than 1 mm Hg for one hour.

About 100 parts of the resultant product are mixed with 8 parts of a methyl hydrogen polysiloxane (50 cP at 25° C.) having a mol ratio of $(CH_3)_2Si:CH_3(H)Si$ of 5:1 and 0.2 parts of a chloroplatinic acid-amino-fluid complex and cured at 100° C. in an air circulating oven. After 1 hour the cured product is heated in air at a temperature of 150° C. for 24 hours and then tested for oil-resistance. The resultant cyclized product exhibited better oil resistant properties than a similar uncyclized composition.

It should be understood that other alkyl acrylates may be used in combination with other acrylonitriles without departing from the scope of this invention.

Although the present invention has been defined with specific reference to the above examples, these examples are given merely for purposes of illustration. Other variations which will become apparent to those skilled in the art are to be included in this invention.

What is claimed is:

1. A method for imparting oil resistant properties to a modified organopolysiloxane composition which comprises reacting a diorganopolysiloxane having hydrocarbon radicals with up to 18 carbon atoms linked to the silicon atoms which are selected from the class consisting of monovalent hydrocarbon radicals, halogenated monovalent hydrocarbon radicals and cyanoalkyl radicals and having terminal groups selected from the class consisting of aliphatic unsaturated groups and hydroxyl groups with a mixture containing an acrylic ester monomer selected from the class consisting of alkyl acrylates and methacrylates in which the alkyl group has from 1 to 4 carbon atoms and a nitrile monomer selected from the class consisting of acrylonitrile, methacrylonitrile and alpha-chloroacrylonitriles in the presence of a free-radical initiator to form a modified organopolysiloxane composition containing polymers and copolymers which are derived from recurring units of the acrylic ester containing monomer and the nitrile containing monomer at a temperature below about 150° C., said diorganopolysiloxane is present in an amount of from 25 to 75 percent by weight based on the weight of the diorganopolysiloxane and acrylic ester and nitrile monomers and said nitrile monomer is present in an amount of from 5 to 95 mol percent based on the nitrile and acrylic ester monomers and when said modified organopolysiloxane contains terminal hydroxyl groups, then a cross-linking agent is added which is selected form the group consisting of silanes of the formula

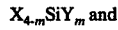

$X_{4-m}SiY_m$ and siloxanes in which the silicon atoms are linked through Si-O-Si linkages, wherein X is selected from the group consisting of alkyl and aryl radicals, Y is selected from the group consisting of acyloxy, oximo, alkoxy, aryloxy, halogen, aminoxy, amido and phosphato groups and m is a number of from 2 to 4, curing said composition in the presence of atomspheric moisture and thereafter heat aging the composition in the presence of air at a temperature of from about 125° C. to 300° C. for at least about 4 hours.

2. The method of claim 1 wherein the monomers consist of a lower alkyl acrylate and acrylonitrile.

3. The method of claim 1 wherein the monomer consist of a lower alkyl acrylate and a chloroacrylonitrile.

4. The method of claim 1 wherein the monomer consist of ethyl acrylate and methacrylonitrile.

5. The method of claim 1 wherein the hydroxyl terminated modified organopolysiloxane composition is mixed with a cross-linking agent selected from the class consisting of polyalkoxysilanes and polyalkoxysiloxanes and a catalyst and cured prior to heat aging.

6. The method of claim 1 wherein the modified organopolysiloxane contains terminal aliphatic unsaturated groups and is mixed with an organohydrogenpolysiloxane and the platinum containing catalyst and cured prior to heat aging.

* * * * *